(12) United States Patent
Francisco

(10) Patent No.: US 8,777,292 B1
(45) Date of Patent: Jul. 15, 2014

(54) REAR ROOF VISOR

(71) Applicant: Dennis Francisco, Walnut, CA (US)

(72) Inventor: Dennis Francisco, Walnut, CA (US)

(*) Notice: Subject to any disclaimer, the term of this patent is extended or adjusted under 35 U.S.C. 154(b) by 0 days.

(21) Appl. No.: 13/915,252

(22) Filed: Jun. 11, 2013

(51) Int. Cl.
*B60J 9/04* (2006.01)
*B60J 3/00* (2006.01)

(52) U.S. Cl.
CPC .................................... *B60J 3/002* (2013.01)
USPC ........................................................... 296/91

(58) Field of Classification Search
CPC .......... B60J 3/0204; B60J 3/0208; B60J 3/04; B60J 3/02; B60J 1/2091
USPC ............ 296/91, 97.5, 97.9, 97.2, 97.1, 97.11, 296/97.12
See application file for complete search history.

(56) References Cited

U.S. PATENT DOCUMENTS

| | | | | |
|---|---|---|---|---|
| 2,206,793 A * | 7/1940 | Staubly | ................... | 296/95.1 |
| 2,497,050 A * | 2/1950 | Thibault | ................... | 160/222 |
| 2,625,425 A * | 1/1953 | Foster | ................... | 296/95.1 |
| 2,815,244 A * | 12/1957 | Francis | ................... | 296/95.1 |
| 3,088,772 A * | 5/1963 | Francis | ................... | 296/95.1 |
| 3,424,490 A * | 1/1969 | Francis | ................... | 296/95.1 |
| D341,563 S * | 11/1993 | Niemi | ................... | D12/191 |
| 5,522,634 A * | 6/1996 | Stanesic et al. | ................... | 362/485 |
| 5,836,640 A * | 11/1998 | Hurayt et al. | ................... | 296/180.2 |
| D403,999 S * | 1/1999 | Lund | ................... | D12/191 |
| D409,541 S * | 5/1999 | Sproull et al. | ................... | D12/191 |
| 5,913,560 A * | 6/1999 | Perin | ................... | 296/97.6 |
| 5,927,792 A * | 7/1999 | Welling et al. | ................... | 296/97.5 |
| 6,099,064 A * | 8/2000 | Lund | ................... | 296/95.1 |
| 6,530,620 B1 * | 3/2003 | Turney et al. | ................... | 296/180.2 |
| D525,574 S * | 7/2006 | Conway et al. | ................... | D12/191 |
| D528,054 S * | 9/2006 | Beigel et al. | ................... | D12/191 |
| 7,841,026 B2 * | 11/2010 | Makris et al. | ................... | 2/424 |

* cited by examiner

Primary Examiner — Kiran B Patel

(57) ABSTRACT

A rear roof visor is provided as an apparatus that is designed to prevent sunlight from obscuring a driver's vision through a vehicle's rear window. The rear roof visor accomplishes this by preventing sunlight from being reflected off of a surface positioned underneath the visor. The rear roof visor is constructed utilizing a durable translucent material that allows the driver to see through the visor if needed. The visor is particularly formed and shaped in order to cooperatively function with the vehicle's aerodynamic characteristic reducing disruptive airflow. The rear roof visor attaches to the vehicle through the use of mounting brackets and a mounting lip. The mounting brackets and the mounting lip are specially formed in order to fit a vehicle's particular contours. Additionally the mounting brackets and the mounting lip utilize adhesive couplers in order to securely retain the visor to said vehicle.

9 Claims, 5 Drawing Sheets

REAR ROOF VISOR

FIELD OF THE INVENTION

The present invention relates generally to a vehicle accessory, more specifically a rear window mounted visor that provides users riding in the vehicle protection from the sun while additionally providing increased visibility to the driver.

BACKGROUND OF THE INVENTION

It is well known that sunlight has the potential to impair a person's vision while driving a vehicle. Normally, the visual impairment caused by sunlight is nothing more than a temporary nuisance yet it is responsible for hundreds of car accidents a year. The visual impairment caused by sunlight is a result of the sun shining directly into the driver's eyes or as a result of the sunlight shining on a reflective surface that then reflects the light into the driver's eyes. While both situations are unpleasant the latter can be solved through the use of a visor which prevents blocks sunlight and prevents it from being reflected by a surface positioned underneath the visor.

Although there are several prior art that describe a visor mounted to a vehicle in order to prevent visual impairment to the driver, the majority of the prior art accomplish this in a disadvantageous manner. Since the vehicle mounted visors are designed to prevent sunlight from being reflected off of a surface positioned underneath the vehicle mounted visor, the vehicle mounted visors are provided as overhanging structure positioned over a vehicles window. While the overhanging structure prevents sunlight from reflecting off of the surface underneath it, the overhanging structure inevitably obscures are portion of the driver's field of view through the window.

It is therefore the object of the present invention to provide a rear roof visor that is able to prevent sunlight from being reflected off of a surface positioned underneath the visor while not obscuring the driver's field of view. The rear roof visor accomplishes this through a unique construction that utilizes a durable translucent material that is transparent allowing the driver to see through the visor if needed. The visor is additionally provided with particular formed shaped that cooperatively functions with the vehicles aerodynamics in manner that reduces disrupting airflow. The rear roof visor attaches to the vehicle through the use of mounting brackets and a mounting lip that incorporate an adhesive coupler in order to retain the visor to the vehicle.

BRIEF DESCRIPTIONS OF THE DRAWINGS

DETAIL DESCRIPTIONS OF THE INVENTION

All illustrations of the drawings are for the purpose of describing selected versions of the present invention and are not intended to limit the scope of the present invention.

Figure 1:
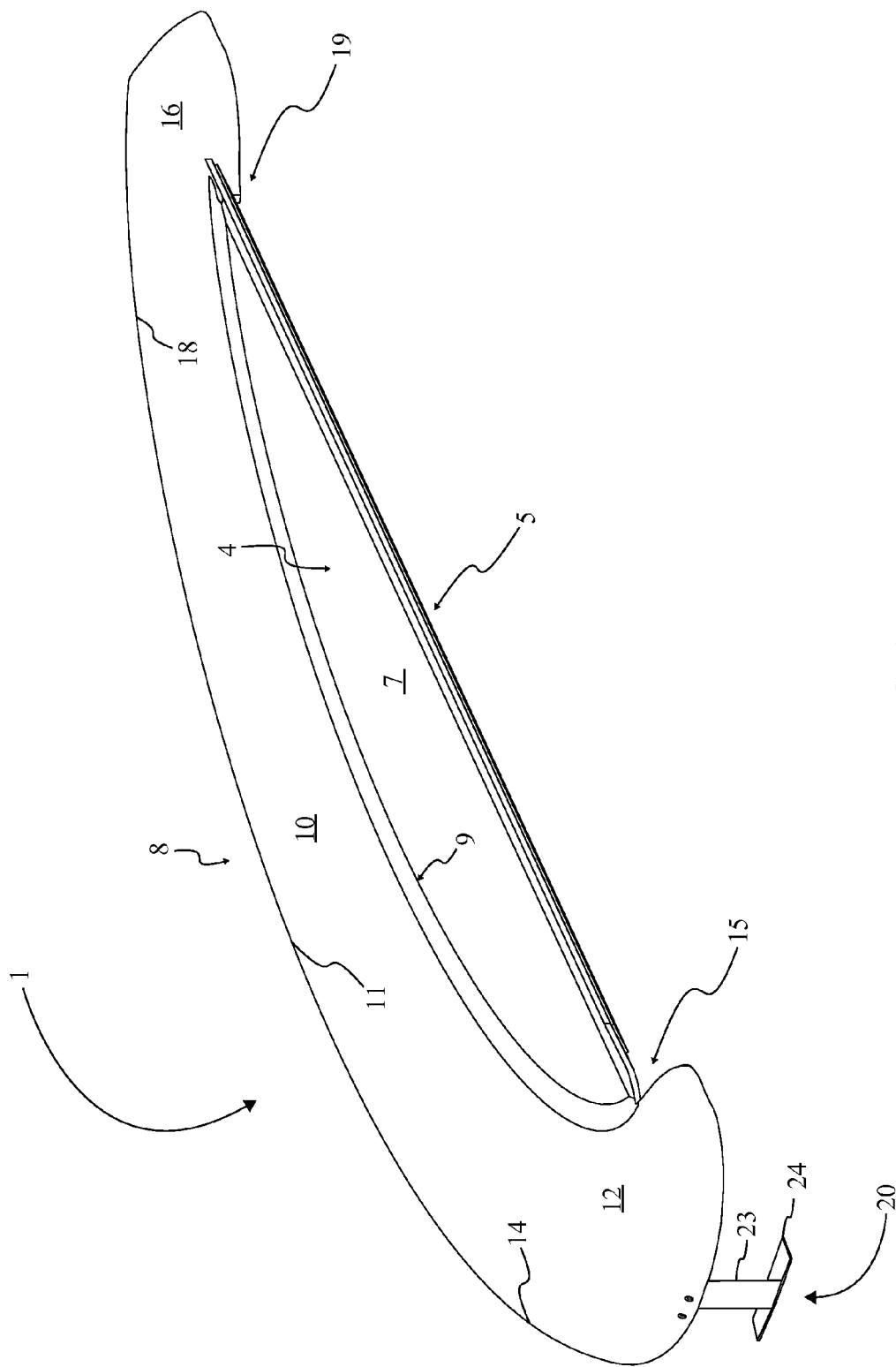
FIG. 1 is a perspective view displaying the upper portion of the visor as per the current embodiment of the present invention.
Figure 3:
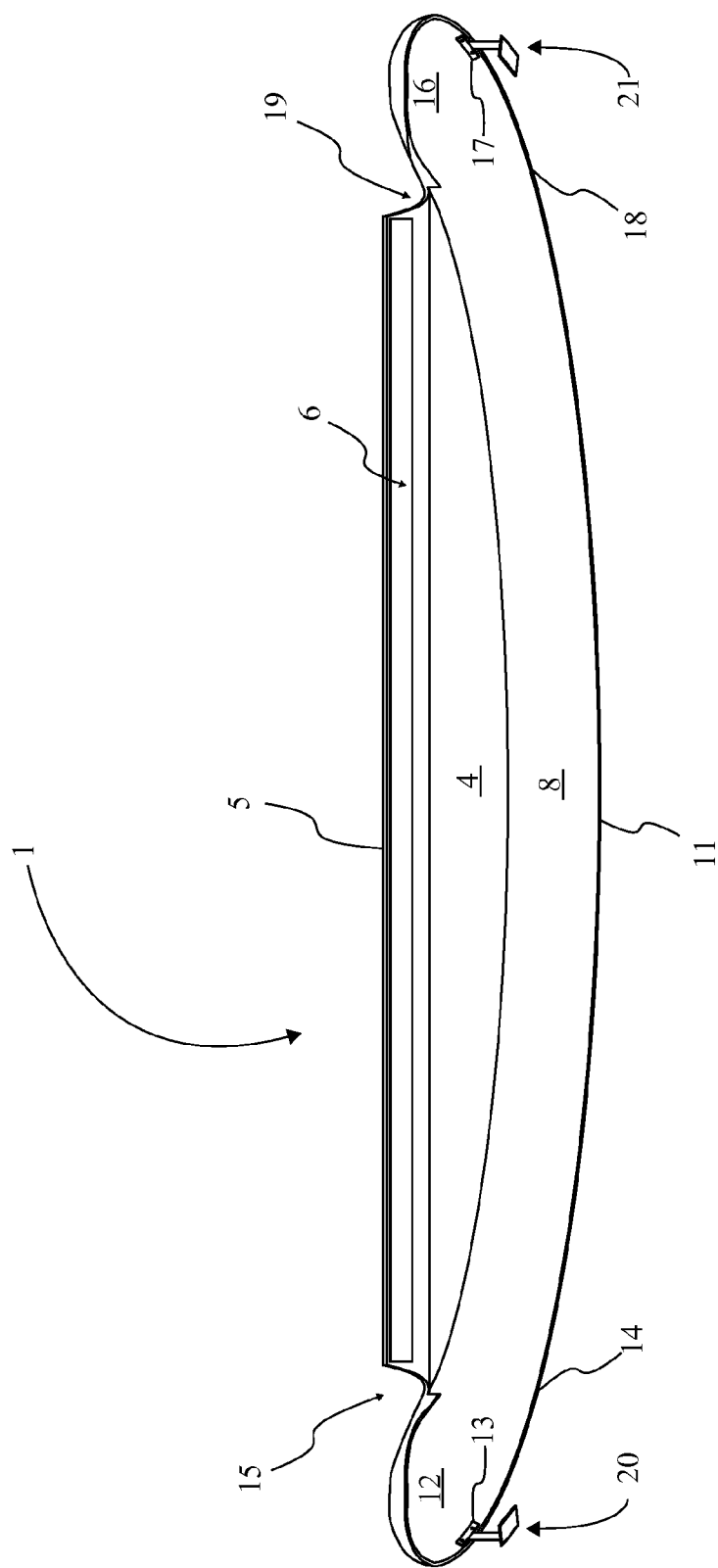
FIG. 3 is a bottom front perspective view of the visor as per the current embodiment of the present invention.

Referencing FIG. 1 and FIG. 3, the present invention is a rear roof visor that provides a vehicle's driver with improved visibility through the vehicle's rear window while additionally protecting occupants from excessive sun light. The rear roof visor accomplishes this through a unique combination of components that permit the present invention to mount to the vehicle's rear roof while limiting disruption to the vehicle's aerodynamics. In the current embodiment of the present invention, the rear roof visor comprises a visor 1, a first mounting bracket 20, and a second mounting bracket 21. The visor 1 is a shaped body with aerodynamically favorable features that prevents sunlight from impeding the vehicle driver's visibility through the vehicle's rear window. The first mounting bracket 20 and the second mounting bracket 21 are provided as structural engagements that correctly position the visor 1 on the vehicle's rear roof while additionally securing and preventing unwanted movement.

Figure 2:
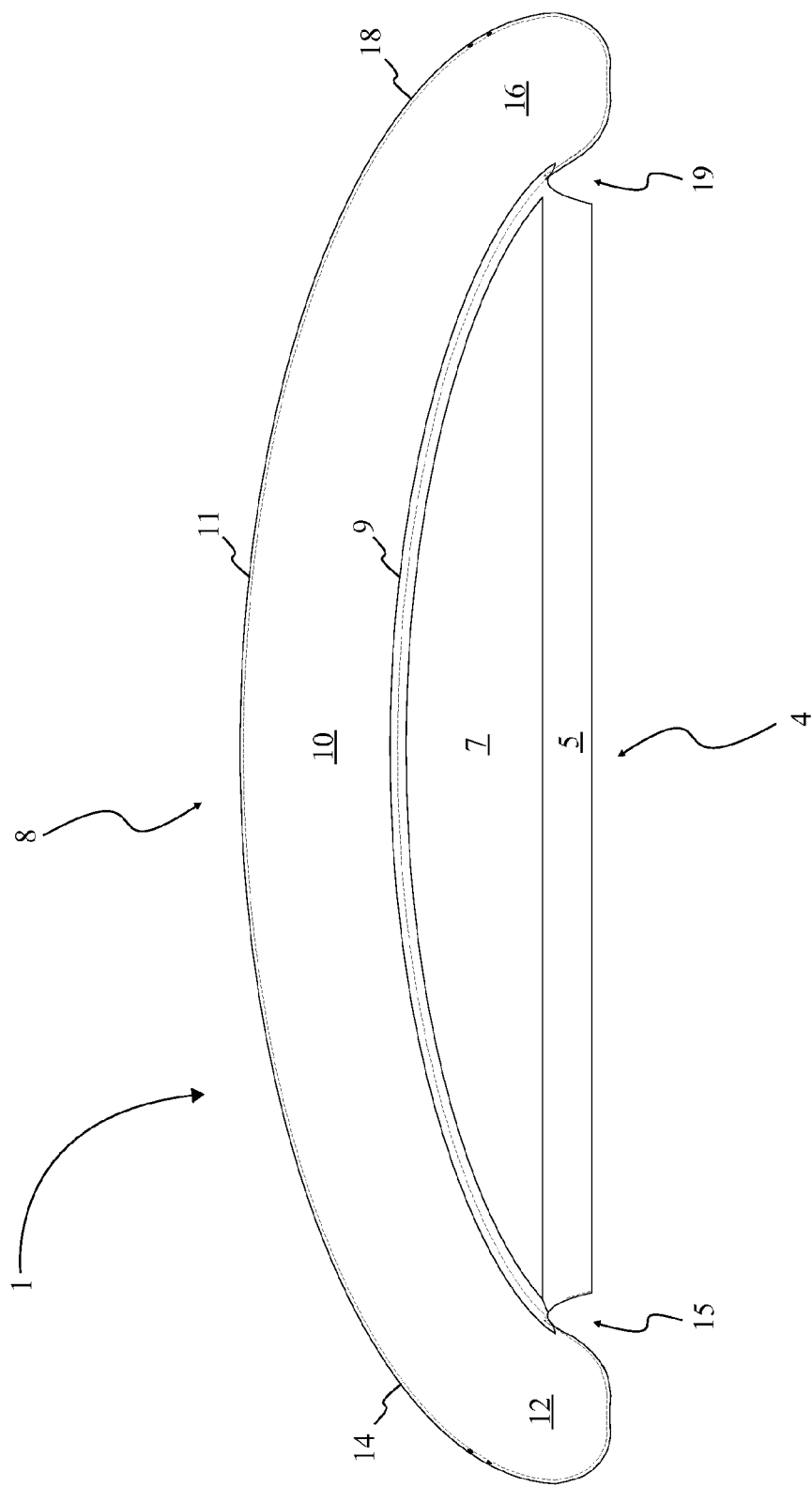
FIG. 2 is a top down elevational view displaying the upper portion of the visor as per the current embodiment of the present invention.
Figure 5:
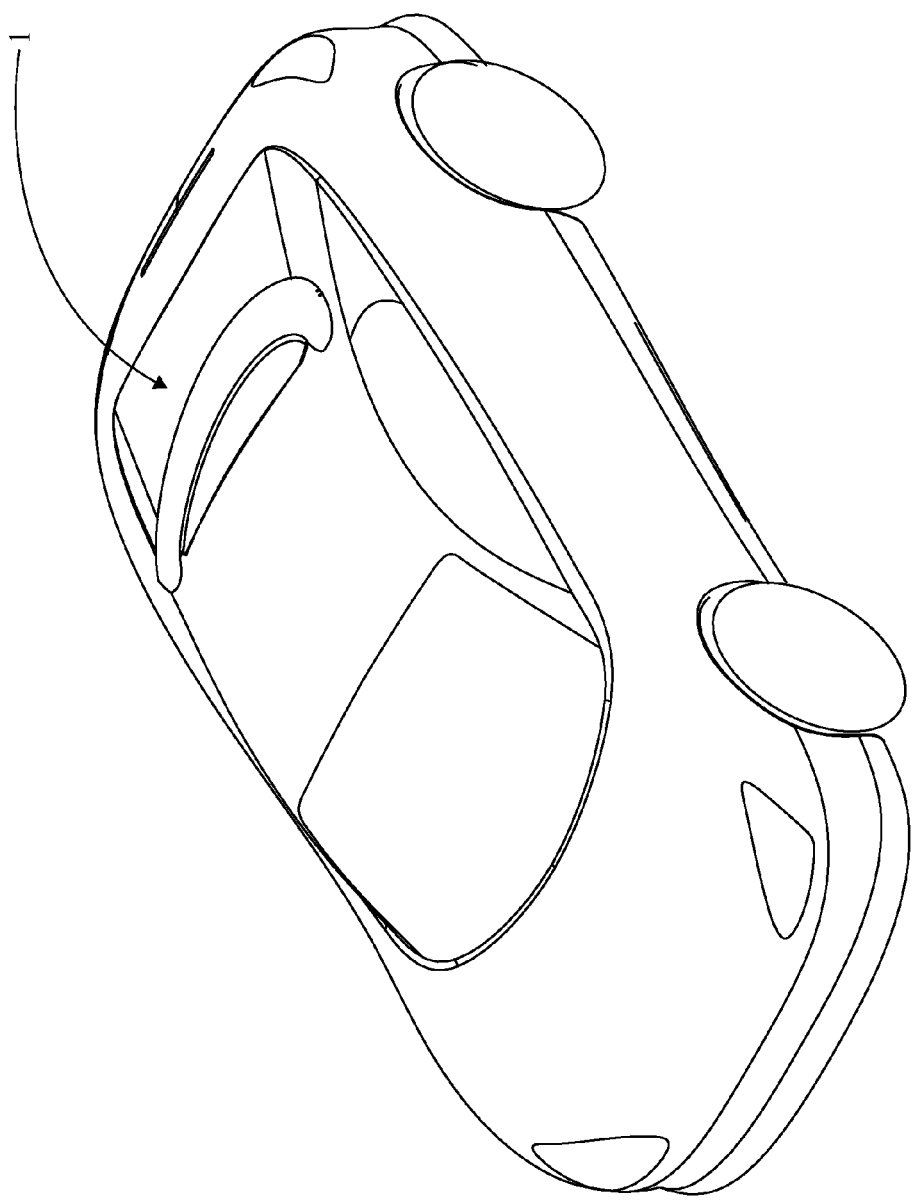
FIG. 5 is a perspective view displaying the rear roof visor mounted to a vehicle as per the current embodiment of the present invention.

Referencing FIG. 2 and FIG. 5, the visor 1 is provided with particularly shaped regions that allow the present invention to have aerodynamically favorable features when attached to the rear roof of the vehicle. The visor 1 is peripherally positioned around the rear window of the vehicle. The particular shape of the visor 1 prevents sunlight from impeding the driver's visibility and additionally protects the occupants of the vehicle from direct sunlight. In the current embodiment of the present invention, the visor 1 is constructed of a durable translucent material. The durable translucent material provides the visor 1 with a semi rigid construction that is able to withstand aerodynamic forces. The durable translucent material additionally prevents the visor 1 from obscuring the driver's visibility by being partially transparent.

Figure 4:
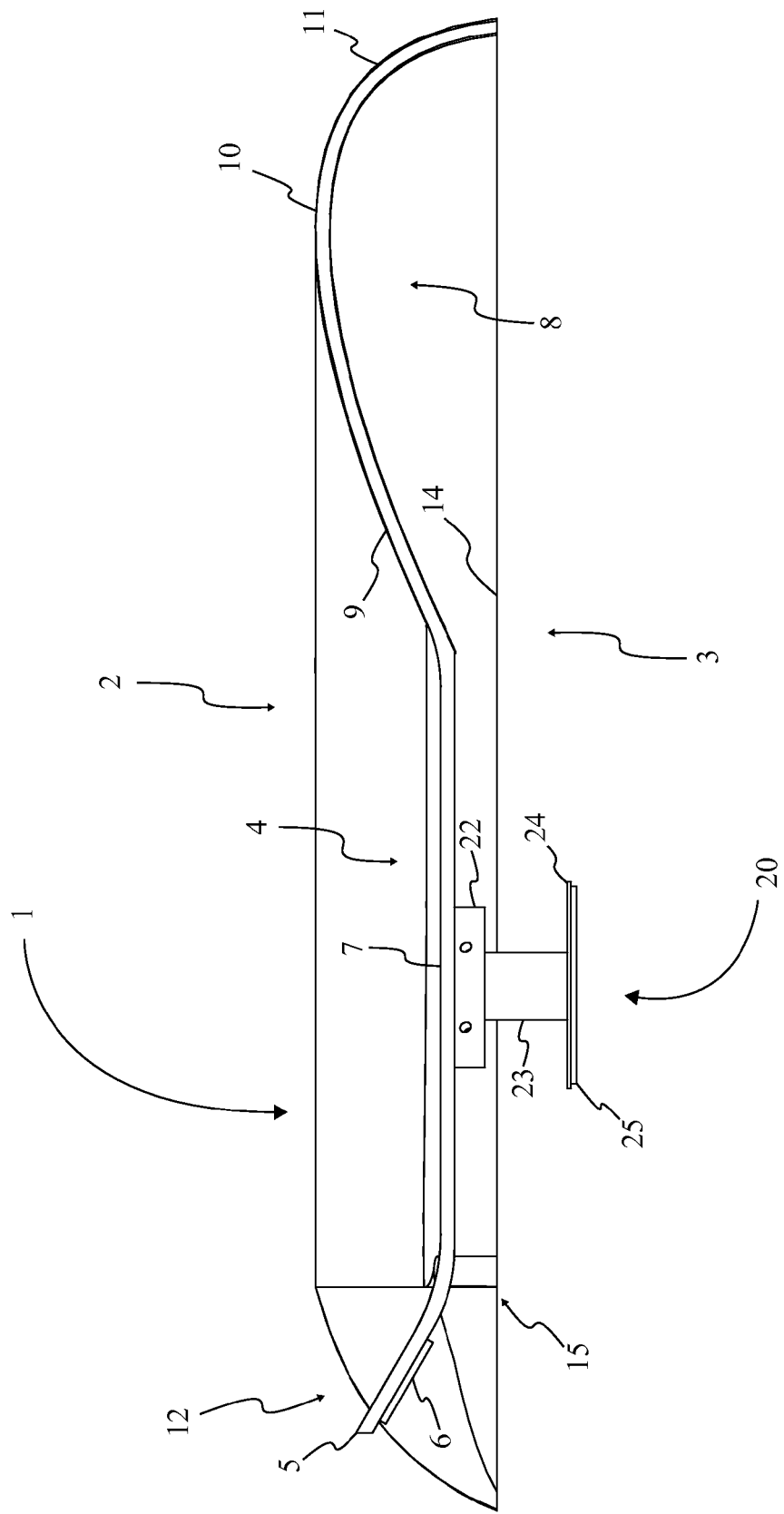
FIG. 4 is a cross sectional view of the visor displaying the contours of the upper portion as per the current embodiment of the present invention.

Referencing FIG. 3 and FIG. 4, the visor 1, in the current embodiment of the present invention, is a shaped body with two prominent surfaces that consist of an upper portion 2 and a lower portion 3. The upper portion 2 is the prominent surface of the visor 1 directly interacts with oncoming airflow and sunlight. The lower portion 3 is the prominent surface of the visor 1 that is most visible by the driver and is additionally the attachment location for the first mounting bracket 20 and the second mounting bracket 21. In the current embodiment of the present invention, both the upper portion 2 and the lower portion 3 comprise a front section 4, a rear section 8, a first side section 12, and a second side section 16. It should be noted that the relationship between the upper portion 2 and the lower portion 3 relative to the front section 4, the rear section 8, first side section 12, and the rear section 8 are transitive in nature, wherein the front section 4, the rear section 8, the first side section 12, and the second side section 16 comprise an upper portion 2 and a lower portion 3. The upper portion 2 of the front section 4 and the rear section 8 interact with oncoming airflow and sunlight. The lower portion 3 of the front section 4 is provided as an attachment point to the vehicle's rear roof. The upper portion 2 of the first side section 12 and the second side section 16 are provided with a particular shape that reduces disruptive lateral airflow. The lower portion 3 of the first side section 12 and the second side section 16 of the lower portion 3 are provided as the engagement point for the first mounting bracket 20 and the second mounting bracket 21, respectively.

Referencing FIG. 1 and FIG. 2, in the current embodiment of the present invention, both the front section 4 and the rear section 8 are positioned between the first side section 12 and the second side section 16. The visor 1 is provided with bilateral symmetry across an imaginary midline that traverses across the front section 4 and the rear section 8. The bilateral symmetry translates into the first side section 12 and the second side section 16 being minor images of one another. In the current embodiment of the present invention, the front section 4 is found peripherally bordered by the first side section 12, the second side section 16, and the rear section 8. The peripheral positioning of the first side section 12, the second side section 16, and the rear section 8 to the front section 4 permits beneficial aerodynamic distribution of airflow across the upper portion 2 of the visor 1 when mounted on the vehicle.

Referencing FIG. 3 and FIG. 4, in the current embodiment of the present invention, the upper portion 2 of the front section 4 comprises a mounting lip 5 and a recessed planar surface 7 while the lower portion 3 of the front section 4 comprises an adhesive strip 6. The recessed planar surface 7 is particularly shaped to minimally disrupt oncoming airflow from the vehicle's rear roof. The recessed planar surface 7 accomplishes this by being partially coplanar to the vehicle's rear roof. The mounting lip 5 is particularly formed to fit on the vehicle's rear roof peripheral to the vehicle's rear window. The mounting lip 5 is angled upwardly away from the recessed planar surface 7. the angled positioning of the adhesive strip 6 is provide as the engagement means that secure the front section 4 to the vehicle's rear roof. The adhesive strip 6 is positioned coincident with the mounting lip 5 on the lower portion 3 of the front section 4 opposite the recessed planar surface 7.

Referencing FIG. 2 and FIG. 4, in the current embodiment of the present invention, the upper portion 2 of the rear section 8 comprises the leading edge 9, the raised surface 10, and the trailing edge 11. The leading edge 9 initially contacts oncoming airflow from the front section 4. The leading edge 9 is positioned between the recessed planar surface 7 and the raised surface 10 in order to direct oncoming airflow from the recessed planar surface 7 over the raised surface 10. The leading edge 9 is arcuately sloped between the recessed planar surface 7 and the raised surface 10, wherein the arcuate slope provides the leading edge 9 curved surface that gradually curves connecting the recessed planar surface 7 and the raised surface 10 in a manner that directs the oncoming airflow over the raised surface 10 without significant disruption. The raised surface 10 is positioned between the leading edge 9 and the trailing edge 11. The raised surface 10 has oncoming airflow pass over it from the leading edge 9. It should be noted that the raised surface 10 is less planar than the recessed planar surface 7 in order to reduce disrupting oncoming airflow that is traversing over the upper portion 2 of the rear section 8. The trailing edge 11 directs oncoming airflow traversing over the raised surface 10 in a downward direction. The trailing edge 11 accomplishes this by having a concavity on the lower portion 3 of the rear section 8 coincident with the trailing edge 11 that directs oncoming airflow from the raised surface 10 towards the ground.

Referencing FIG. 2 and FIG. 5, in the current embodiment of the present invention, the upper portion 2 of the first side section 12 comprises a first curved edge 14 and a first vehicle pillar mount 15. The upper portion 2 of the second side section 16 comprises a second curved edge 18 and a second vehicle pillar mount 19. The first side section 12 is positioned oppositely to the second side section 16 across the front section 4 and the rear section 8. The relational positioning between the first side section 12 and the second side section 16 translates to a symmetrical component arrangement across the visor 1, wherein the first curved edge 14 and the second curved edge 18 as well as the first vehicle pillar mount 15 and the second vehicle pillar mount 19 are symmetrically distributed to one another on the visor 1. The first curved edge 14 directs oncoming airflow that traverses over the upper portion 2 of the first side section 12 in a downward direction. The second curved edge 18 directs oncoming airflow that traverse over the upper portion 2 of the second side section 16 in a downward direction. the first side section 12 is found positioned coincident to the trailing edge 11 while the second curved edge 18 is found positioned coincident with the trailing edge 11 opposite to the first curved edge 14. The coincident positioning between the first curved edge 14 and the second curved edge 18 to the trailing edge 11 provides the upper portion 2 with more cohesive airflow. the first vehicle pillar mount 15 and the second vehicle pillar mount 19 are provided as the means of securing the visor 1 to sections of the vehicle that are positioned laterally to the rear window, wherein the sections of the vehicle coincident with the first vehicle pillar mount 15 and the second vehicle pillar mount 19 would correspond to either the right or left rear pillar of the vehicle. The first vehicle pillar mount 15 and the second pillar mount are found positioned on either side of the mounting lip 5, wherein the mounting lip 5 is found positioned between the first vehicle pillar mount 15 and the second vehicle pillar mount 19. The positioning to the mounting lip 5 for the first vehicle pillar mount 15 and the second vehicle pillar mount 19 reduces disruptive airflow over the upper portion 2 of the visor 1 while additionally adding improved structural support between the visor 1 and the rear roof.

Referencing FIG. 3 and FIG. 4, in the current embodiment of the present invention, the lower portion 3 of the first side section 12 comprises a first bracket coupler 13 while the lower portion 3 of the second side section 16 comprises a second bracket coupler 17. The first bracket coupler 13 is provided as the attachment means between the first mounting bracket 20 and the first side section 12. The second bracket coupler 17 is provided as the attachment means between the second mounting bracket 21 and the second side section 16. Both the first mounting bracket 20 and the second mounting bracket 21 each comprise a visor mounting plate 22, a connector plate 23, a vehicle mounting plate 24, and a plate adhesive coupler 25. The visor mounting plate 22 is corresponds to the component of the first mounting bracket 20 and the second mounting bracket 21 that engages the first bracket coupler 13 and the second bracket coupler 17, respectively. The visor mounting plate 22 is found joined to the vehicle mounting plate 24 by way of the connector plate 23. the connector plate 23 is provides a rigid construction to the first mounting bracket 20 and the second mounting bracket 21 in a manner that allows the present invention to adjust the angle of the vehicle mounting plate 24 in order to properly engage with the vehicle. The vehicle mounting plate 24 is able to securely engage the vehicle through the use of the plate adhesive coupler 25. The plate adhesive coupler 25 is provided as the means of retaining the vehicle mounting plate 24 to the peripheral areas surrounding the vehicles rear window.

In the current embodiment of the present invention, the visor 1 is constructed of a durable translucent material. The durable translucent material utilized in the construction of the visor 1 is made from high quality injection acrylic. It should be noted that while the current embodiment of the present invention provides the visor 1 as being translucent, an additional embodiment can elect an opaque construction in order to improve the rigidity of the present invention.

In the current embodiment of the present invention, both the first mounting bracket 20 and the second mounting bracket 21 are provided as the means of securing the visor 1 to the rear portion of a vehicle's roof. Although the main function of the first mounting bracket 20 and the second mounting bracket 21 is to secure the visor 1 to the vehicle, an additional embodiment of the present invention may provide both the first mounting bracket 20 and the second mounting bracket 21 with a material construction that counter act vibrations. In the additional embodiment of the present invention, both the first mounting bracket 20 and the second mounting bracket 21 would be constructed of spring steel, which when used with the plate adhesive coupler 25, permits the rear roof visor to have a greater elasticity for withstanding variable force situations. The greater elasticity provides the rear roof visor with greater stability during use.

Although the invention has been explained in relation to its preferred embodiment, it is to be understood that many other possible modifications and variations can be made without departing from the spirit and scope of the invention as hereinafter claimed.

The invention claimed is:

1. A rear roof visor comprises:
a visor;
a first mounting bracket;
a second mounting bracket;
the visor comprises a front section, a rear section, a first side section, and a second side section;
both the first mounting bracket and the second side mounting bracket each comprises a visor mounting plate, a connector plate, a vehicle mounting plate, and a plate adhesive coupler;
the front section, the rear section, the first side section, and the second side section comprises a upper portion and a lower portion;
the upper portion of the front section comprises a mounting lip and a recessed planar surface;
the lower portion of the front section comprises an adhesive strip;
the upper portion of the rear section comprises a leading edge, a raised surface, and a trailing edge;
the upper portion of the first side section comprises a first curved edge and a first vehicle pillar mount;
the lower portion of the first side section comprises a first bracket coupler;
the upper portion of the second side section comprises a second curved edge and a second vehicle pillar mount; and
the lower portion of the second side section comprises a second bracket coupler.

2. The rear roof visor as claimed in claim 1, wherein the visor is constructed of a durable translucent material.

3. The rear roof visor as claimed in claim 1 comprises:
the first mounting bracket being engaged to the lower portion of the first side section;
the second mounting bracket being engaged to the lower portion of the second side section;
the first bracket coupler being engaged to the visor mounting plate of the first mounting bracket;
the second bracket coupler being engaged to the visor mounting plate of the second mounting bracket;
the vehicle mounting plate and the visor mounting plate being joined together through the connector plate; and
the plate adhesive coupler being engaged adjacent to the vehicle mounting plate opposite the connector plate.

4. The rear roof visor as claimed in claim 1 comprises:
both the front section and the rear section being positioned between the first side section and the second side section;
the front section being peripherally bordered by the first side section, the rear section, and the second side section;
the mounting lip being positioned between the first vehicle pillar mount and the second vehicle pillar mount;
the first curved edge being coincident with the trailing edge; and
the second curved edge being coincident with the trailing edge opposite the first curved edge.

5. The rear roof visor as claimed in claim 1 comprises:
the recessed planar surface being positioned between the mounting lip and the leading edge;
the raised surface being positioned between the leading edge and the trailing edge;
the leading edge being arcuately sloped between the recessed planar surface and the raised surface;
the trailing edge being concave from the raised surface towards the lower portion;
the mounting lip being upwardly angled away from the recessed planar surface; and
the adhesive strip being positioned coincident on the mounting lip opposite the recessed planar surface.

6. A rear roof visor comprises:
a visor being constructed of a durable translucent material;
a first mounting bracket;
a second mounting bracket;
the visor comprises a front section, a rear section, a first side section, and a second side section;
both the first mounting bracket and the second side mounting bracket each comprises a visor mounting plate, a connector plate, a vehicle mounting plate, and a plate adhesive coupler;
the front section, the rear section, the first side section, and the second side section comprises a upper portion and a lower portion;
the upper portion of the front section comprises a mounting lip and a recessed planar surface;
the lower portion of the front section comprises an adhesive strip;
the upper portion of the rear section comprises a leading edge, a raised surface, and a trailing edge;
the upper portion of the first side section comprises a first curved edge and a first vehicle pillar mount;
the lower portion of the first side section comprises a first bracket coupler;
the upper portion of the second side section comprises a second curved edge and a second vehicle pillar mount; and
the lower portion of the second side section comprises a second bracket coupler.

7. The rear roof visor as claimed in claim 6 comprises:
the first mounting bracket being engaged to the lower portion of the first side section;
the second mounting bracket being engaged to the lower portion of the second side section;
the first bracket coupler being engaged to the visor mounting plate of the first mounting bracket;
the second bracket coupler being engaged to the visor mounting plate of the second mounting bracket;
the vehicle mounting plate and the visor mounting plate being joined together through the connector plate; and
the plate adhesive coupler being engaged adjacent to the vehicle mounting plate opposite the connector plate.

8. The rear roof visor as claimed in claim 6 comprises:
both the front section and the rear section being positioned between the first side section and the second side section;
the front section being peripherally bordered by the first side section, the rear section, and the second side section;
the mounting lip being positioned between the first vehicle pillar mount and the second vehicle pillar mount;

the first curved edge being coincident with the trailing edge;
the second curved edge being coincident with the trailing edge opposite the first curved edge;
the recessed planar surface being positioned between the mounting lip and the leading edge;
the raised surface being positioned between the leading edge and the trailing edge;
the leading edge being arcuately sloped between the recessed planar surface and the raised surface;
the trailing edge being concave from the raised surface towards the lower portion;
the mounting lip being upwardly angled away from the recessed planar surface; and
the adhesive strip being positioned coincident on the mounting lip opposite the recessed planar surface.

9. A rear roof visor comprises:
a visor being constructed of a durable translucent material;
a first mounting bracket;
a second mounting bracket;
the visor comprises a front section, a rear section, a first side section, and a second side section;
both the first mounting bracket and the second side mounting bracket each comprises a visor mounting plate, a connector plate, a vehicle mounting plate, and a plate adhesive coupler;
the front section, the rear section, the first side section, and the second side section comprises a upper portion and a lower portion;
the upper portion of the front section comprises a mounting lip and a recessed planar surface;
the lower portion of the front section comprises an adhesive strip;
the upper portion of the rear section comprises a leading edge, a raised surface, and a trailing edge;
the upper portion of the first side section comprises a first curved edge and a first vehicle pillar mount;
the lower portion of the first side section comprises a first bracket coupler;
the upper portion of the second side section comprises a second curved edge and a second vehicle pillar mount;
the lower portion of the second side section comprises a second bracket coupler;
the first mounting bracket being engaged to the lower portion of the first side section;
the second mounting bracket being engaged to the lower portion of the second side section;
the first bracket coupler being engaged to the visor mounting plate of the first mounting bracket;
the second bracket coupler being engaged to the visor mounting plate of the second mounting bracket;
the vehicle mounting plate and the visor mounting plate being joined together through the connector plate;
the plate adhesive coupler being engaged adjacent to the vehicle mounting plate opposite the connector plate;
both the front section and the rear section being positioned between the first side section and the second side section;
the front section being peripherally bordered by the first side section, the rear section, and the second side section;
the mounting lip being positioned between the first vehicle pillar mount and the second vehicle pillar mount;
the first curved edge being coincident with the trailing edge;
the second curved edge being coincident with the trailing edge opposite the first curved edge;
the recessed planar surface being positioned between the mounting lip and the leading edge;
the raised surface being positioned between the leading edge and the trailing edge;
the leading edge being arcuately sloped between the recessed planar surface and the raised surface;
the trailing edge being concave from the raised surface towards the lower portion;
the mounting lip being upwardly angled away from the recessed planar surface; and
the adhesive strip being positioned coincident on the mounting lip opposite the recessed planar surface.

\* \* \* \* \*